(12) United States Patent
Wickham et al.

(10) Patent No.: US 12,492,872 B2
(45) Date of Patent: Dec. 9, 2025

(54) HEAT EXCHANGE UNIT

(71) Applicant: HELICAL ENERGY INC., Overland Park, KS (US)

(72) Inventors: Mark Wickham, Avening (GB); Christopher Wickham, Mortlake (GB)

(73) Assignee: HELICAL ENERGY INC., Overland Park, KS (US)

( * ) Notice: Subject to any disclaimer, the term of this patent is extended or adjusted under 35 U.S.C. 154(b) by 156 days.

(21) Appl. No.: 18/256,619

(22) PCT Filed: Dec. 9, 2021

(86) PCT No.: PCT/GB2021/053219
§ 371 (c)(1),
(2) Date: Jun. 8, 2023

(87) PCT Pub. No.: WO2022/123249
PCT Pub. Date: Jun. 16, 2022

(65) Prior Publication Data
US 2024/0035757 A1 Feb. 1, 2024

(30) Foreign Application Priority Data

Dec. 9, 2020 (GB) ..................................... 2019404

(51) Int. Cl.
*F28F 27/02* (2006.01)
(52) U.S. Cl.
CPC .......... *F28F 27/02* (2013.01); *F28F 2250/06* (2013.01)
(58) Field of Classification Search
CPC .............................. F28F 27/02; F28F 2250/06
See application file for complete search history.

(56) References Cited

U.S. PATENT DOCUMENTS 3,223,151 A * 12/1965 Tramontini ............ B60H 1/025
237/2 A
2007/0125317 A1 6/2007 Jekerle et al.
(Continued)

FOREIGN PATENT DOCUMENTS

DE 3913422 A1 10/1990
DE 102006037773 A1 2/2008
(Continued)

OTHER PUBLICATIONS

International Search Report and Written Opinion in International Application No. PCT/GB2021/053219, dated Feb. 28, 2022, 15 pages.
(Continued)

*Primary Examiner* — Eric S Ruppert
(74) *Attorney, Agent, or Firm* — Smith Baluch LLP (57) ABSTRACT

There is provided a heat exchange unit (1) for recovering heat energy from a hot gas, the heat exchange unit comprising an inlet duct (11) for receiving the hot gas, a heat exchange duct (22) having a heat exchanger (25) for recovering heat from the hot gas, and a bypass duct (24) which bypasses the heat exchange duct and the heat exchanger, wherein the heat exchange unit further comprises a damper (30) configured to apportion the hot gas from the inlet duct (11) between flowing through the heat exchange duct (22) and flowing through the bypass duct (24), wherein the damper (30) is in the shape of a cone, or comprises rotatable shafts with paddles having two sides that converge towards one another to define a taper in the paddle, the taper directed radially away from the shaft.

17 Claims, 7 Drawing Sheets

(56) References Cited

U.S. PATENT DOCUMENTS

| | | | |
|---|---|---|---|
| 2008/0029253 A1 | 2/2008 | Kuniavskyi et al. | |
| 2011/0180234 A1* | 7/2011 | Wickham | F28F 27/02 165/100 |
| 2016/0146555 A1 | 5/2016 | Champneys | |

FOREIGN PATENT DOCUMENTS

| | | | |
|---|---|---|---|
| EP | 1088194 B1 | | 2/2003 |
| EP | 2324318 B1 | | 12/2013 |
| EP | 2936040 A1 | | 10/2015 |
| EP | 2577206 B1 | | 12/2016 |
| GB | 1303092 A | | 1/1973 |
| JP | H1026236 A | | 1/1998 |
| KR | 20100008862 A | * | 1/2010 |
| WO | 2007084011 A1 | | 7/2007 |

OTHER PUBLICATIONS

United Kingdom Search Report in U.K. Application No. GB2019404.9 dated May 24, 2021, 6 pages.

* cited by examiner

HEAT EXCHANGE UNIT

CROSS-REFERENCE TO RELATED APPLICATIONS

The present application is a national-phase application, under 35 U.S.C. § 371, of International Application No. PCT/GB2021/053219, filed on Dec. 9, 2021, which in turn claims the priority benefit of United Kingdom Application No. 2019404.9, filed on Dec. 9, 2020. Each of these applications is incorporated herein by reference in its entirety for all purposes.

FIELD OF THE INVENTION

The present invention relates to a heat exchange unit for recovery of heat from hot gases. The hot gases may for example be exhaust gases of an engine or gas turbine within an industrial power plant.

BACKGROUND OF THE INVENTION

Known heat exchangers for this purpose are described in the inventor's earlier European patents EP 1,088,194 B1, EP 2,577,206 B1 and EP 2,324,318 B1. These patents describe various techniques for apportioning hot gas between a heat exchange duct having a heat exchanger and a bypass duct that bypasses the heat exchange duct. The bypass duct is used to reduce the amount of gas flowing through the heat exchange duct, to regulate the amount of heat being delivered to the heat exchanger.

A damper system is used to apportion the incoming hot gas between the heat exchange duct and the bypass duct, however one of the problems with damper systems are that they tend to increase the back-pressure at the gas inlet. If the back-pressure becomes too large, then the efficiency of the engine or gas turbine may drop, and may result in damage to the engine or gas turbine. Heat exchangers inevitably produce back-pressure as the gas is forced through them, and the more back-pressure created by the damper, the less back-pressure the heat exchanger is allowed to create, which either restricts the efficiency of the heat exchanger or results in a larger and heavier heat exchanger.

Another consideration is that the incoming gas flow ideally needs to be apportioned between the heat exchange duct and the bypass duct in a manner that minimises any turbulence that is created in the gas flow. Turbulence is undesirable since it leads to vibrations that can cause damage to the heat exchange unit and other plant equipment. Whilst turbulence can be reduced by using longer ducts with wider diameters, this is undesirable due to the extra space required to accommodate the ducts.

It is therefore an object of the invention to provide an improved heat exchange unit.

SUMMARY OF THE INVENTION

According to a first aspect of the invention, there is provided a heat exchange unit for recovering heat energy from a hot gas. The heat exchange unit comprises an inlet duct for receiving the hot gas, a heat exchange duct having a heat exchanger for recovering heat from the hot gas, and a bypass duct which bypasses the heat exchange duct and the heat exchanger. The heat exchange unit further comprises a damper configured to apportion the hot gas from the inlet duct between flowing through the heat exchange duct and flowing through the bypass duct, wherein the damper is in the shape of a cone and comprises a plurality of shafts extending from a base of the cone towards an apex or frustum of the cone, the shafts fitted with paddles for opening and closing the heat exchange duct and bypass duct, wherein the shafts are rotatable to move the paddles to apportion the hot gas between flowing through the heat exchange duct and flowing through the bypass duct.

Since the damper is in the shape of a cone, the airflow approaching the damper flows smoothly over the surface of the cone whilst creating minimum turbulence. The cone shape also has advantages in reducing the back-pressure created by the damper, since the cone shape has a greater surface area than an equivalent flat damper arranged perpendicular to the air flow, and so the paddles can be made larger in the cone shaped design than in a flat damper design. The surface area of the cone shaped damper is much larger than the planar horizontal damper described in the earlier patent EP 2,324,318 E1, for example 40% larger for a cone shape where the lateral surface extends at an angle of 45 degrees from the central axis of the cone shape. This allows the damper paddles to be formed to provide a larger opening area and to be profiled in such a way as to provide better flow control and linearity.

The heat exchange unit may comprise an inner casing pipe and an outer casing pipe that together define the bypass and heat exchange ducts, and the inner casing pipe may be inside of the outer casing pipe, so that the heat exchange duct and the bypass duct are arranged with one inside of the other to provide a compact system. Preferably, the bypass duct is an interior of the inner casing pipe, and the heat exchange duct is a tubular region between the inner and outer casing pipes. The inner and outer casing pipes are preferably concentric with one another for equal airflow all around the inner casing pipe.

The outer casing pipe may extend beyond an end of the inner casing pipe, and the extension of the outer casing pipe beyond the end of the inner casing pipe may define an inlet manifold to which the inlet duct is connected. This provides a compact and economic construction where the outer casing pipe serves to both define the inlet manifold and the outer extent of the heat exchange duct.

The damper may define a boundary between the inlet manifold and the bypass and heat exchange ducts, the hot gas from the inlet duct required to pass through the damper before reaching the bypass and heat exchange ducts. Accordingly, the paddles can be controlled to admit or block air flow through different regions of the damper to control the flow of hot gas from the inlet manifold into the bypass and/or heat exchange ducts.

The inlet duct may have a lengthwise axis which is aligned with a lengthwise axis of the cone shape, and so the hot gas entering from the inlet duct may impinge directly on the apex or frustum of the cone shape, smoothly directing the hot gas in all directions around the cone shape with minimal turbulence.

Alternatively, the inlet may have a lengthwise axis which intersects with a lengthwise axis of the cone shape, preferably at a perpendicular angle. Then, hot gas entering from the inlet duct may impinge on a side of the cone shape and smoothly flow around opposing sides of the cone shape, minimising turbulence.

The exhaust gas from a gas turbine or engine may approach the heat exchange unit either vertically upwards or horizontally, either of which the conical damper design is able to easily accommodate. A conical damper provides improved flow distribution in comparison to the earlier patents EP 1,088,194 B1, EP 2,577,206 B1 and EP 2,324, 318 B1, with vertical or horizontal gas flow. In the horizontal gas flow case the conical damper acts as a flow distribution device, allowing the exhaust gas inlet to be beneficially mounted pointing towards the axial centreline of the heat exchange unit, rather than tangentially as shown in FIGS. 2, 3, 4, 5 and 6 of the earlier patent EP 2577206 B1, allowing 50% of the exhaust gas flow to be directed either side of the vertical axis of the heat exchange unit, rather than 100% to one side only. It can be seen that halving the flow will have a large effect on reducing pressure drop, as it halves the velocity and pressure drop is the square of velocity. It can also be seen that a horizontal inlet on the axial centreline would reduce the plot area taken up by the heat exchange unit as there is no offset from the centreline of the gas turbine.

The lengthwise axis of the cone shape is preferably aligned with the lengthwise axis of the inner and outer casings, so that the cone is positioned centrally over the end of the inner casing.

Since the paddles can controlled by rotating the shafts, the cone shape of the damper remains the same regardless of whether the damper is directing the gas into the heat exchange duct or into the bypass duct.

The heat exchanger may comprise fluid pipes within the tubular region between the inner and outer casing pipes, and the fluid pipes may be fixed to the inner casing pipe, the inner casing pipe supporting the whole weight of the fluid pipes. This simplifies the construction and integration of the heat exchanger into the heat exchange unit, since the inner casing and heat exchanger can simply be together slid into the outer casing pipe.

Preferably, the fluid pipes are wound in coils about an axis that is aligned with a lengthwise axis of the inner casing pipe. This allows the fluid pipes to be wound around a mandrel during manufacturing, and then removed and slid over the inner casing, prior to securing them to the inner casing. Alternatively, in some embodiments the inner casing could become the mandrel with the added benefit of speeding up manufacturing and assembly time.

The damper may comprise a plurality of struts extending from the base of the cone shape towards the apex or frustum of the cone shape, wherein each strut is attached to the inner casing pipe and to the outer casing pipe. The struts therefore enable the damper to support the weight of the cone shape. Preferably, each strut comprises a distal end at the base of the cone shape and a proximal end at the apex or frustum of the cone shape, wherein the distal ends of the struts are attached to the outer casing pipe, and wherein an end of the inner casing pipe is attached to the struts at points intermediate of the distal and proximal ends of the struts.

The damper as shown in FIGS. 6, 7, 8 of the earlier patent EP 2,324,318 B1 is horizontal in nature and so is very limited in the vertical downward load it can carry without considerable strengthening of the damper's structure. As a result the load of the heat exchanger has to be carried by the outer casing, which has to be strong enough to carry the loads and the damper strong enough to carry the bypass duct which is attached to it. On the other hand the conical damper as described herein is by its geometry naturally strong in nature, in fact around eight times stronger for a cone shape where the lateral surface extends at an angle of 45 degrees from the central axis of the cone shape, compared to a horizontal damper which is mostly in bending and shear, whereas the conical damper as described herein is mostly in tension. The conical damper therefore has the benefit of being able to carry much more load and may be beneficially designed to carry the load of the bypass duct with the heat exchanger attached to it, which allows the outer casing to be designed purely as a lighter weight wind/weather shield that could be removed completely for maintenance of the heat exchanger without affecting the structural integrity of the unit.

Another advantage is that the conical damper shape has a lower centre of gravity than a horizontal damper, which is beneficial since it will reduce the forces applied to any supporting structure, especially in a dynamic situation such as on an offshore floating oil or gas production vessel.

Optionally, the distal ends of the shafts may protrude through the outer casing to reach an exterior of the outer casing. One or more actuators could be mounted to the exterior of the outer casing to control the angular rotation of the shafts. Alternatively, the distal ends could be connected via lever arms to a slewing ring which could be actuated by a single or plurality of actuators. It may alternatively be possible to rotate the distal ends of the shafts manually instead of using actuators if desired.

The damper may comprise panels that define an outer lateral surface of the cone shape, wherein the panels define a plurality of apertures through the outer lateral surface, and wherein the paddles are sized to substantially fill corresponding ones of the apertures at specific angular rotations of the shafts. Then, the panels which are fixed in position are always present to help smooth the air flow along the lateral surface of the cone shape and into the apertures. Embodiments in which there were no such panels and the outer lateral surface of the cone shape was instead fully defined by the paddles could also be envisaged.

At least one of the shafts, struts and panels may be angled at between 20 and 70 degrees to the lengthwise axis of the cone shape, more preferably between 30 and 60 degrees to the lengthwise axis of the cone shape, or still more preferably between 40 and 50 degrees to the lengthwise axis of the cone shape. Accordingly, the lateral surface of the cone shape may extend at an angle of between 20 and 70 degrees to the cone shape, more preferably between 30 and 60 degrees to the lengthwise axis of the cone shape, or still more preferably between 40 and 50 degrees to the lengthwise axis of the cone shape, although 45 degrees is most beneficial for most applications.

Each shaft may comprise two of the paddles at different locations to one another along a length of the shaft, wherein one of those two paddles is configured to control flow of hot gas into the heat exchange duct and the other of those two paddles is configured to control flow of hot gas into the bypass duct. The two paddles of each shaft may be angled perpendicular to one another, so that one of the paddles closes the bypass duct whilst the other paddle opens the heat exchange duct, and vice versa. Alternatively, the paddles may be angled at less than perpendicular to one another if required, which would reduce the angle that shafts would have to rotate through to move between opening and closing the ducts.

The paddles may extend radially outward from the shafts, with each paddle tapering to a point as it extends radially away from the shaft. Since the tapered point of the paddle is furthest radially from the shaft, the gas will first begin to flow around the point as the paddle begins to be opened, and the surface area revealed by the movement of the point is relatively small. This can provide a more linear increase in gas flow past the paddle as the shaft is rotated. For controlling a process temperature, in this case the fluid in the fluid pipes of the heat exchanger, it is desirable to have linear gas flow through the damper in line with the damper opening percentage, which makes for the ideal process control and less damper modulation and hunting.

According to a second aspect of the invention, there is provided a heat exchange unit for recovering heat energy from a hot gas, the heat exchange unit comprising an inlet duct for receiving the hot gas, a heat exchange duct having a heat exchanger for recovering heat from the hot gas, and a bypass duct which bypasses the heat exchange duct and the heat exchanger. The heat exchange unit further comprises a damper configured to apportion the hot gas from the inlet duct between flowing through the heat exchange duct and flowing through the bypass duct. The heat exchange unit also comprises an outer casing pipe and an inner casing pipe within the outer casing pipe, the outer casing pipe and inner casing pipe together defining the bypass and heat exchange ducts, wherein the damper is in the shape of a cone and comprises a plurality of struts extending from the base of the cone shape towards the apex or frustum of the cone shape, and wherein each strut is attached to the inner casing pipe and to the outer casing pipe.

Since the struts of the cone shaped damper are attached to both the inner casing pipe and the outer casing pipe, the damper can support the full weight of the inner casing pipe upon the outer casing pipe, and the full weight of the heat exchanger which may be mounted on the inner casing pipe. The heat exchange unit of the second aspect may include any one or more of the features of the first aspect described further above.

Conventional damper paddles have a long and straight side edge at the furthest radial extend of the paddle. Therefore, only a few degrees of rotation of the shaft are needed before a large flow rate of gas is able to pass by the paddle.

According to a third aspect of the invention, there is provided a heat exchange unit for recovering heat energy from a hot gas, the heat exchange unit comprising an inlet duct for receiving the hot gas, a heat exchange duct having a heat exchanger for recovering heat from the hot gas, and a bypass duct which bypasses the heat exchange duct and the heat exchanger. The heat exchange unit further comprises a damper configured to apportion the hot gas from the inlet duct between flowing through the heat exchange duct and flowing through the bypass duct, wherein the damper comprises a plurality of shafts fitted with paddles for opening and closing the heat exchange duct and bypass duct. The shafts are rotatable to move the paddles to apportion the hot gas between flowing through the heat exchange duct and flowing through the bypass duct, wherein each paddle comprises two sides that converge towards one another to define a taper in the paddle, the taper directed radially away from the shaft.

The taper means that the narrowest part of the paddle is furthest radially from the shaft, and so the gas will first begin to flow around that narrowest part of the paddle as the paddle begins to be opened. The surface area revealed by the movement of the narrowest part of the paddle is relatively small, and so this can provide a more linear increase in gas flow past the paddle as the shaft is rotated. The flow rate therefore becomes easier to control and modulate. The taper preferably has a central axis that is perpendicular to the shaft.

The two sides defining the taper of the paddle preferably converge to a point of the paddle that is at a furthest radial extent from the shaft, so that the gas flow rate when the paddle first begins to open is minimised.

Each paddle may comprise at least five sides, including one side that is perpendicular to the corresponding shaft, two sides that taper towards one another in a direction radially away from a first side of the corresponding shaft, and two sides that taper towards one another in a direction radially away from a second side of the corresponding shaft, wherein the first and second sides of the corresponding shaft are opposite to one another. Accordingly, the paddle may in the shape of a diamond, with the shaft aligned axially along the diamond shape, preferably defining an axis of symmetry of the diamond shape.

The heat exchange unit of the third aspect may include any one or more of the features of the first and/or second aspects described further above.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
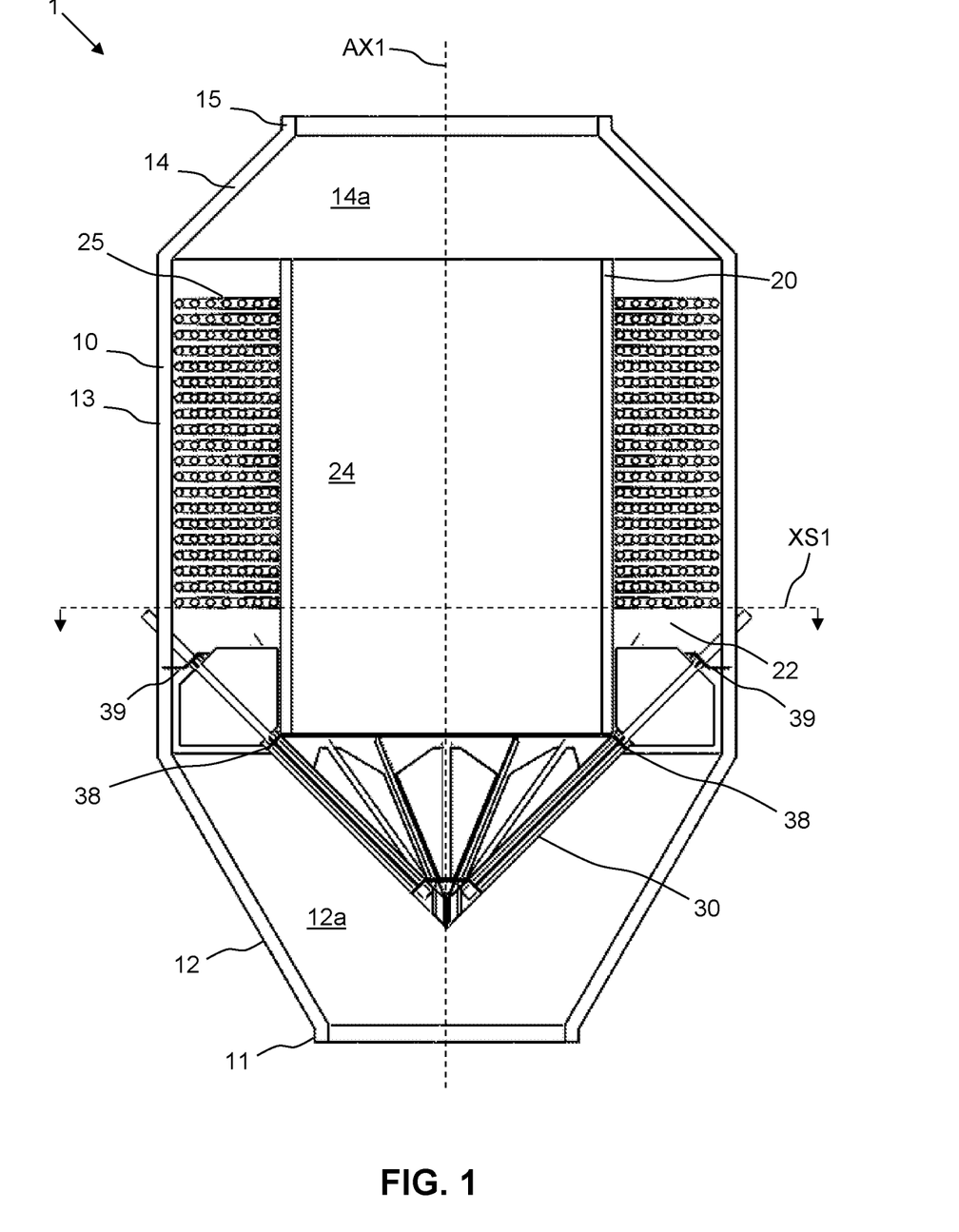
FIG. 1 shows a schematic sectional diagram of a heat exchange unit according to a first embodiment of the invention.

A first embodiment of the invention will now be described with reference to FIGS. 1 to 7. The schematic diagram of FIG. 1 shows a heat exchange unit 1 comprising an outer casing pipe 10, and inner casing pipe 20, and a damper 30. The inner casing pipe 20 may be fully inside of the outer casing pipe 10, and the inner casing pipe 20 may be connected to the outer casing pipe 10 by the damper 30, which is in the shape of a cone. The outer casing pipe 10, inner casing pipe 20, and conical damper 30 may each have a central longitudinal axis, and those axes may all be aligned with one another along AX1, as shown. In this particular embodiment, the outer casing pipe 10 and inner casing pipe 20 may have circular cross-sections, whereas the damper 30 may have an octagonal cross-section.

The region inside of the inner casing pipe 20 is a bypass duct 24, and the tubular region between the inner casing pipe 20 and the outer casing pipe 10 is a heat exchange duct 22. The heat exchange duct 22 has a heat exchanger formed from heat exchanger fluid pipe(s) 25, which may be mounted upon and encircle the inner casing pipe 20.

The outer casing pipe 10 may have a lower portion 12, an upper portion 14, and a middle portion 13 between the upper and lower portions. The middle portion 13 may have a substantially constant diameter, which tapers along the lower portion 12 to an inlet duct 11, and tapers along the upper portion 14 to an outlet duct 15. The inlet and outlet duct may also each have a central axis aligned along the axis AX1.

The lower portion 12 of the outer casing pipe 10 extends beyond the end of the inner casing pipe 20, and the internal region inside of the lower portion 12 may be an inlet manifold 12a, to which the inlet duct 11 is connected. Hot gas from the inlet duct 11 may enter the inlet manifold 12, and then the damper 30 may be used to control whether the hot gas enters the bypass duct 24 or the heat exchange duct 22. Both the bypass duct 24 and the heat exchange duct 22 may lead to an outlet manifold 14a corresponding to the region inside of the upper portion 14. The outlet manifold 14a may be connected to the outlet manifold 15. Once the hot gas has passed through the bypass duct 24 or the heat exchange duct 22, it enters the outlet manifold 14a, and is ejected from the heat exchange unit 1 via the outlet manifold 15.

Figure 2:
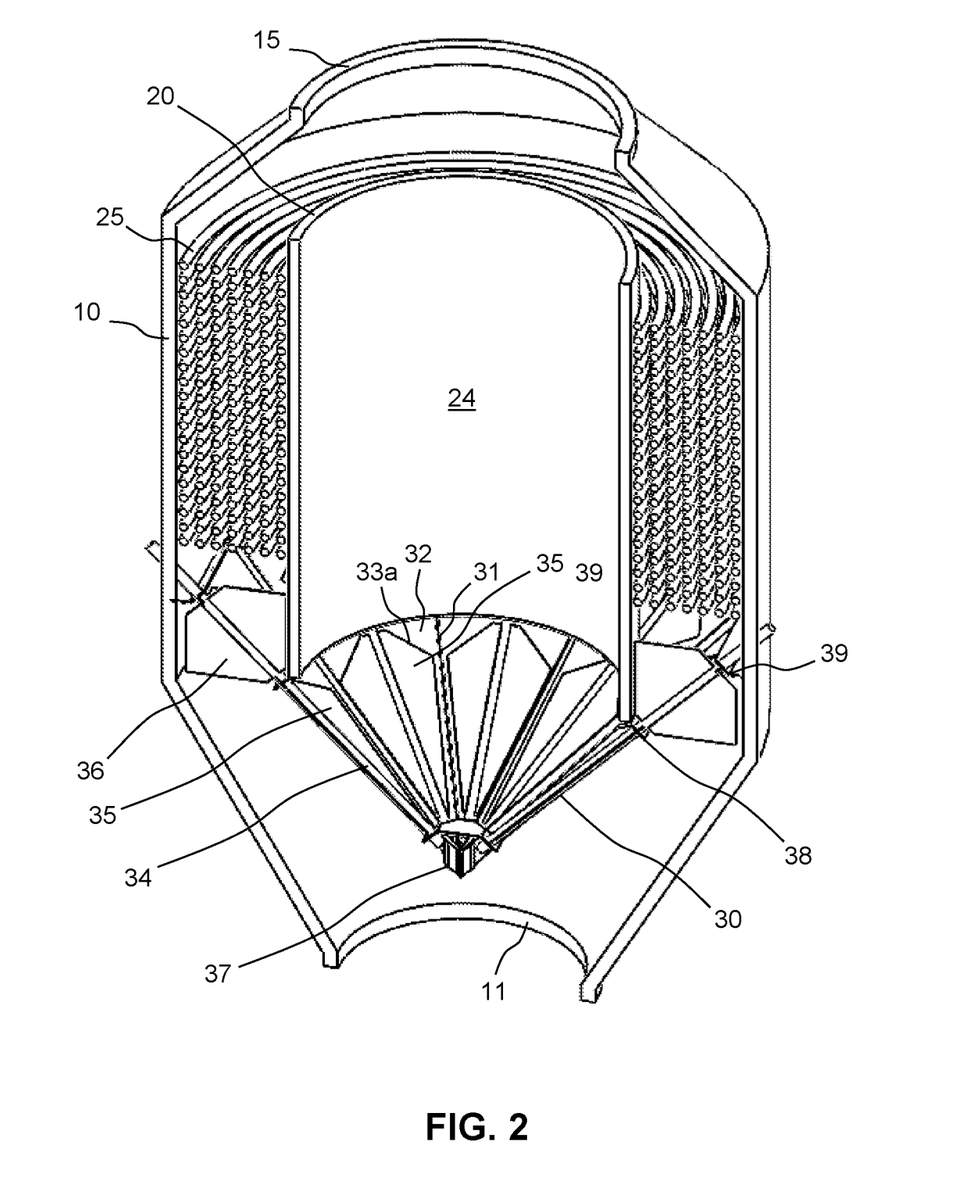
FIG. 2 shows a schematic sectional diagram similar to FIG. 1 but in perspective view.

The schematic diagram of FIG. 2 shows a perspective view of the same section through the heat exchange unit as shown in FIG. 1. Here, it can be seen how the heat exchanger fluid pipe(s) 25 encircle around the inner casing pipe 20. The heat exchanger pipes may be manufactured by winding the pipes around a mandrel of similar circumference to the inner casing pipe 20, and then transferring the pipe(s) 25 from the mandrel to the inner casing pipe 20, and securing them in place. Heat from the hot gas flowing through the heat exchange duct 22 is transferred to fluid flowing through the pipe(s) 25, thereby recovering heat from the hot gas. The pipes 25 may be connected to heat conductive fins forming part of the heat exchanger, to improve transfer of heat from the hot gas to the fluid inside the pipes.

If the fluid inside the heat exchanger pipe(s) 25 rises beyond a threshold, then the damper 30 may be used to divert some or all of the hot gas to the bypass duct 24, instead of the heat exchange duct 22, to prevent overheating and/or damage to the heat exchanger. Since the axes of the conical damper 30 and the inlet duct 11 are aligned with one another along the axis AX1, and the tip (apex) of the cone shape points downwardly away from the inner casing pipe 20 and towards the inlet duct 11, the hot gas incoming from the inlet duct will impinge on the tip of the cone shape, which is formed by lower brace 37. This evenly distributes the flow of the hot gas around the circumference of the cone shape, minimising turbulence.

The conical damper 30 may comprise a plurality of struts 31 that extend from the tip of the cone shape to the base of the cone shape. The struts 31 are fixed to the lower brace 37 at the tip of the cone shape and to the upper brace 39 at the base of the cone shape. The upper brace 39 is fixed to the outer casing pipe 10 to fix the conical damper in position within the outer casing pipe. The struts 31 may be evenly spaced around the circumference of the cone shape.

The struts 31 may also be connected to a mid brace 38, which encircles around the circumference of the cone shape intermediate the lower and upper braces. As best seen in FIG. 1, the end of the inner casing 20 may enter inside of the cone shape of the conical damper 30, and may be connected to the mid brace 38. The struts 31 between the outer and inner casing pipes may therefore be in tension, with the weight of the inner casing pipe 20 and the heat exchanger pipe(s) being transferred to the outer casing pipe 10 by the struts 31.

The conical damper also comprises shafts 34 extending from the base of the conical damper towards the tip (apex) of the conical damper 30. The shafts may be evenly spaced around the circumference of the damper, and may be held by the lower brace 37 at the tip, and the upper brace 39 at the base, in a manner that allows the shafts 34 to be rotated. The shafts 34 may extend through the outer casing pipe 10, allowing their rotations to be controlled from outside of the heat exchange unit. Each shaft 34 may be spaced equidistant between two of the struts 31.

Each shaft 34 is fitted with a bypass paddle 35 that control gas flow into the bypass duct 24, and a heat exchanger paddle 36 that controls gas flow into the heat exchange duct 22. The bypass paddle 35 and the heat exchanger paddle 36 may be set at a perpendicular angle to one another, so that when one paddle is completely open, perpendicular to the lateral surface of the cone shape, the other paddle is completely closed, parallel to the lateral surface of the cone shape.

The struts 31 and the braces 37, 38 and 39 may be used to support panels 32 that cover the lateral surface of the cone shape. The panels 32 may prevent the hot gas from passing through the damper, except for at the regions where the paddles are located. The panels 32 may define apertures 33a and 33b (see FIG. 3), and the paddles may be sized to fully fill the apertures when the paddles are rotated to be parallel to the lateral surface of the cone shape.

Figure 3:
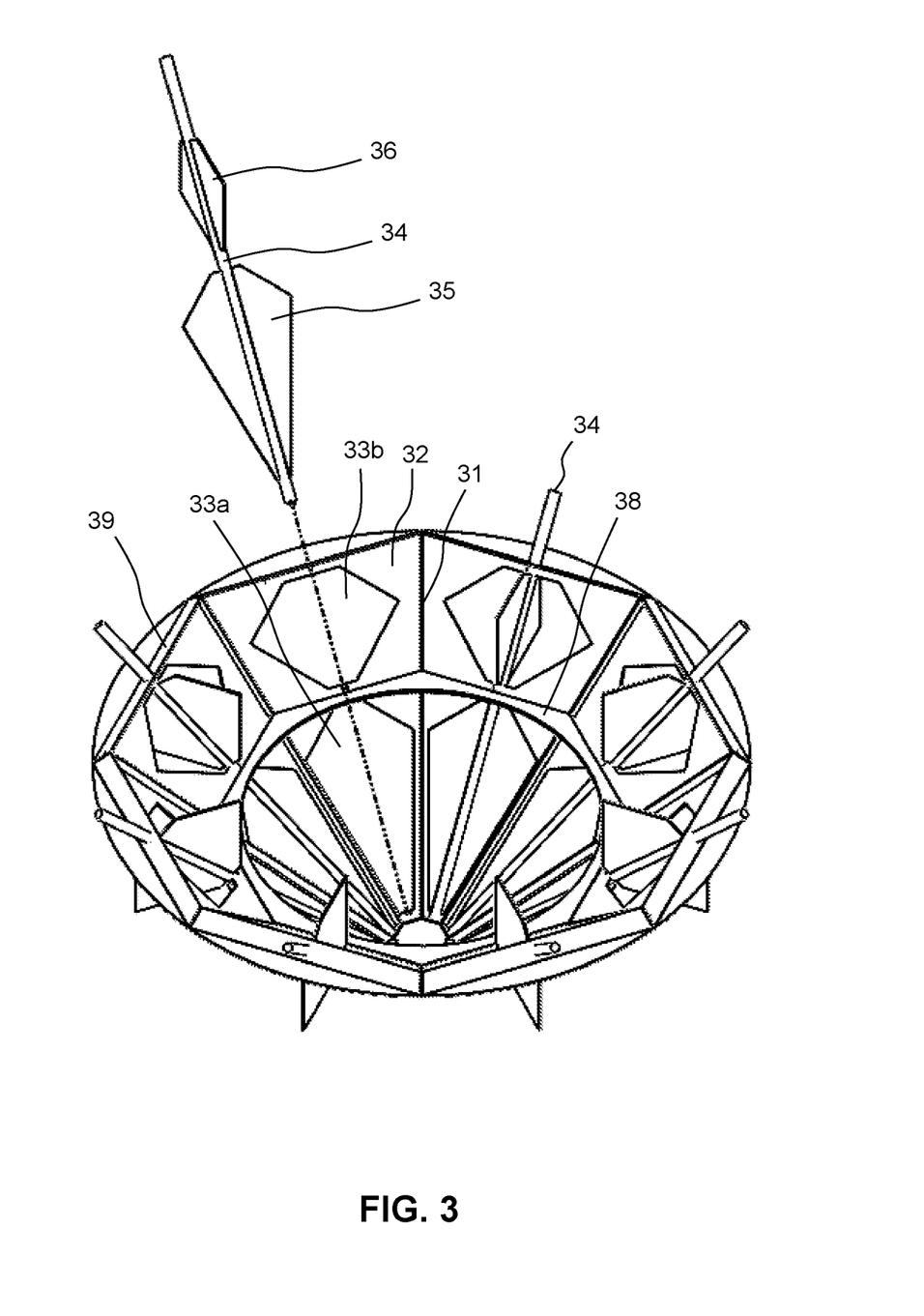
FIG. 3 shows a schematic perspective diagram of a damper forming part of the heat exchange unit of FIG. 1.

The schematic diagram of FIG. 3 shows the damper 30 in more detail, separately from the rest of the heat exchange unit. One of the shafts 34 and its corresponding paddles 35 and 36 has been shown exploded from the damper so that the apertures 33a and 33b can be better seen. The bypass paddles 35 are rotated by the shafts 34 to control gas flow from the inlet manifold 12a to the bypass duct 24 via the apertures 33a, and the heat exchanger paddles 36 are rotated by the shafts 34 to control gas flow from the inlet manifold 12a to the heat exchange duct 22 via the apertures 33b. FIGS. 1 to 3 show the paddles in positions that close the bypass duct and open the heat exchange duct.

Figure 4:
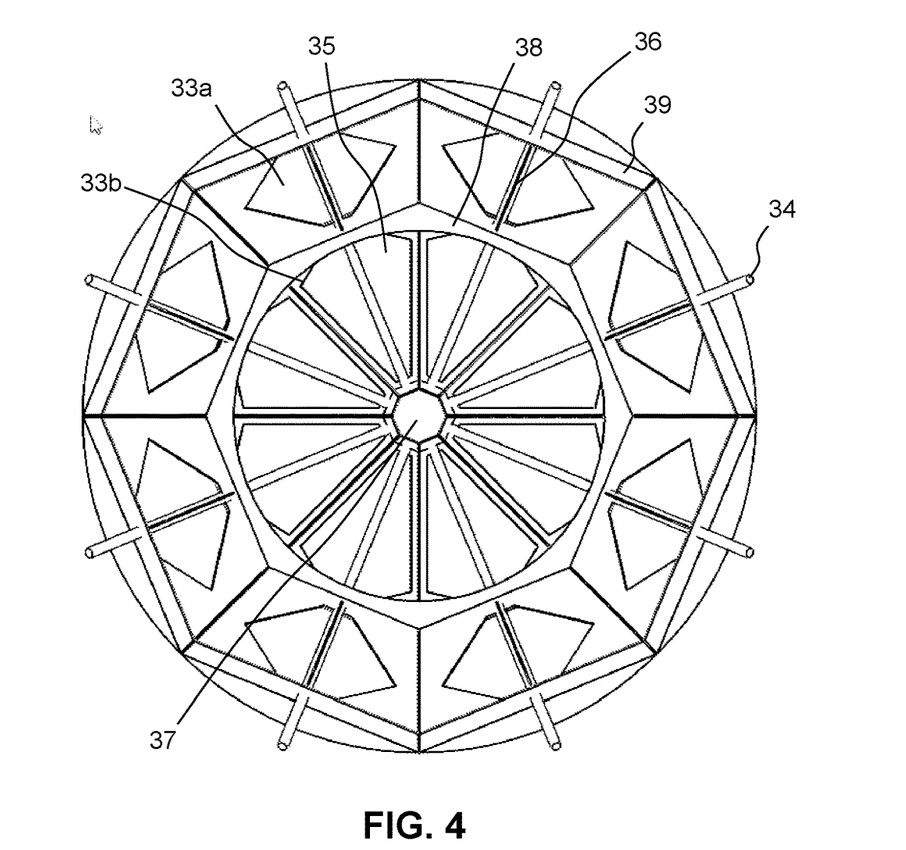
FIG. 4 shows a schematic plan diagram of the damper of FIG. 3.

FIG. 4 shows another schematic diagram of the damper 30, taken in plan view when looking along the axis AX1 marked in FIG. 1. Here, the braces 37, 38 and 39 can be more easily seen, as well as the octagonal shape of the braces 37 and 38, which correspond to the eight shafts 34 and the eight struts 34.

Figure 5:
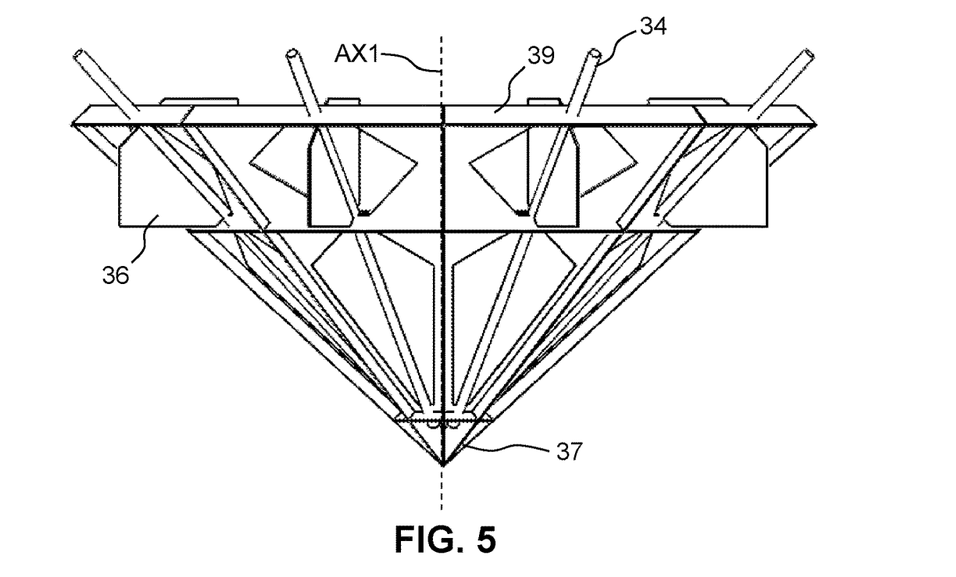
FIG. 5 shows a schematic side elevation of the damper of FIG. 3.
Figure 6:
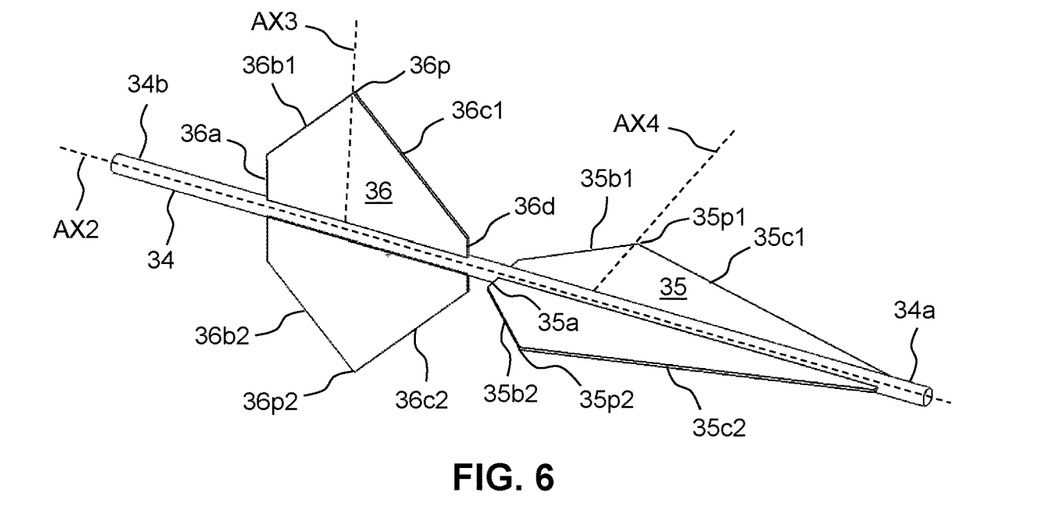
FIG. 6 shows a schematic perspective diagram of a shaft with paddles forming part of the damper of FIG. 3.

FIG. 5 shows a side elevation of the damper 30, illustrating of the struts 31 of the cone shape are at an angle of 45 degrees to the central axis AX1 of the cone shape. This angle balances the need for the cone shape to support the inner casing pipe 20 stably on the axis AX1, and the need for the cone shape to provide a large area for the paddles, to reduce flow resistance.

The schematic diagram of FIG. 5 shows a close up view of one of the shafts 34 and its paddles 35 and 36. As shown, the shaft 34 may extend from a proximal end 34a to a distal end 34b, and have a central axis AX2 aligned along the length of the shaft. The damper paddle 35 may be adjacent the proximal end 34a of the shaft, and the heat exchanger paddle 36 may be adjacent the distal end 34b. Each of the dampers may be a flat and planar panel. The proximal ends 34a of the shafts may fit into the lower brace 37, and the distal ends 34b of the shafts may fit through the upper brace 39 and through the outer casing pipe 10.

The damper paddle 35 may have a first edge 35a that is perpendicular to the shaft axis AX2, two side edges 35b1 and 35c1 that taper to a point 35p1 on one side of the shaft, and two side edges 35b2 and 35c2 that taper to a point 35p2 on the opposite side of the shaft. Accordingly, the damper paddle 35 may have five sides and be in the shape of a two-dimensional diamond.

The points 35p1 and 35p2 are at the furthest radial extent of the paddle 35 from the shaft 34, and the tapers of the paddle defined by the two side edges 35b1 and 35c1 and the side edges 35b2 and 35c2 extend in a radial direction away from the shaft. For example, the taper defined by the side edges 35b1 and 35c1 has a central axis AX4, which is perpendicular to the axis AX2 of the shaft 34.

The heat exchanger paddle 36 may have a first edge 36a that is perpendicular to the shaft axis AX2, two side edges 36b1 and 36c1 that taper to a point 36p1 on one side of the shaft, and two side edges 36b2 and 36c2 that taper to a point 36p2 on the opposite side of the shaft. The heat exchanger paddle 36 may also have a second edge 36d that is perpendicular to the shaft axis AX2. Accordingly, the heat exchanger paddle 36 may have six sides and be in the shape of a two-dimensional diamond with the point along the axis of symmetry of the diamond shape truncated, by the second edge 36d.

The points 36p1 and 36p2 are at the furthest radial extent of the paddle 36 from the shaft 34, and the tapers of the paddle defined by the two side edges 36b1 and 36c1 and the side edges 36b2 and 36c2 extend in a radial direction away from the shaft. For example, the taper defined by the side edges 36b1 and 36c1 has a central axis AX3, which is perpendicular to the axis AX2 of the shaft 34. Since the paddles 35 and 36 are orientated perpendicular to one another, the axis AX3 is perpendicular to the axis AX4.

FIG. 4 shows the shafts 34 at rotations where the bypass paddles 35 are parallel to the lateral surface of the cone shape, fitting within and substantially fully blocking the apertures 33b defined by the panels 32. When the shafts 34 are rotated from this position, the points 35p1 and 35p2 move in opposite directions to one another away from the panels 32, opening up a small area for hot gas to begin to flow through, and beginning to close the apertures 33a. This small area and the tapers of the paddles helps to linearise the increase in gas flow verses the change in shaft angle, making the gas flow easier to control. The further the shafts are rotated, the more gas flows through the bypass duct 24 and the less gas flows though the heat exchange duct 22, until the shafts have been rotated by 90 degrees and all of the gas flows through the bypass duct 24 rather than the heat exchange duct 22.

Figure 7:
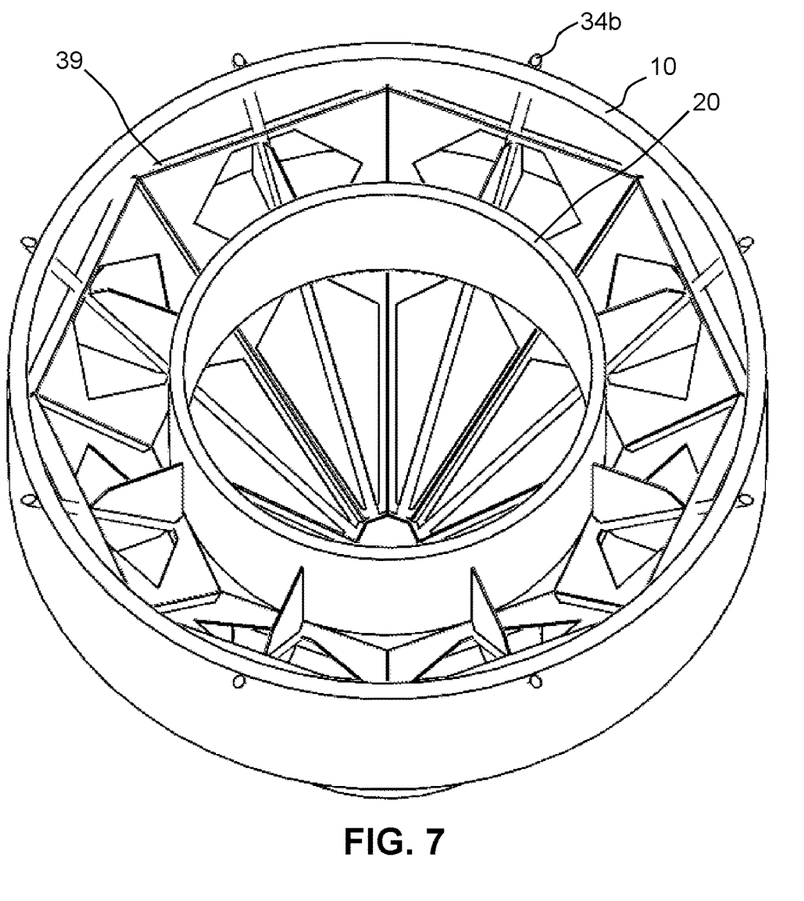
FIG. 7 shows a schematic sectional diagram of the heat exchange unit of FIG. 1, taken from line XS1 marked on FIG. 1.

The schematic diagram of FIG. 7 shows a sectional view of the heat exchange unit 1, taken along line XS1 marked on FIG. 1. The end of the inner casing pipe 20 is visible in FIG. 7, and may be mounted on the mid brace 38 (see FIG. 3). Accordingly, the mid brace 38 may be used to attach the inner casing pipe 20 to the struts 31, to support the weight of the inner casing pipe 20 and the heat exchanger pipe(s) 25. The end of the outer casing pipe 10 is also visible in FIG. 7, and it can be seen that the upper brace 39 may be fixed to the inner surface of the outer casing pipe 10, with the distal ends 34b of the shafts extending through the outer casing pipe 10.

Figure 8:
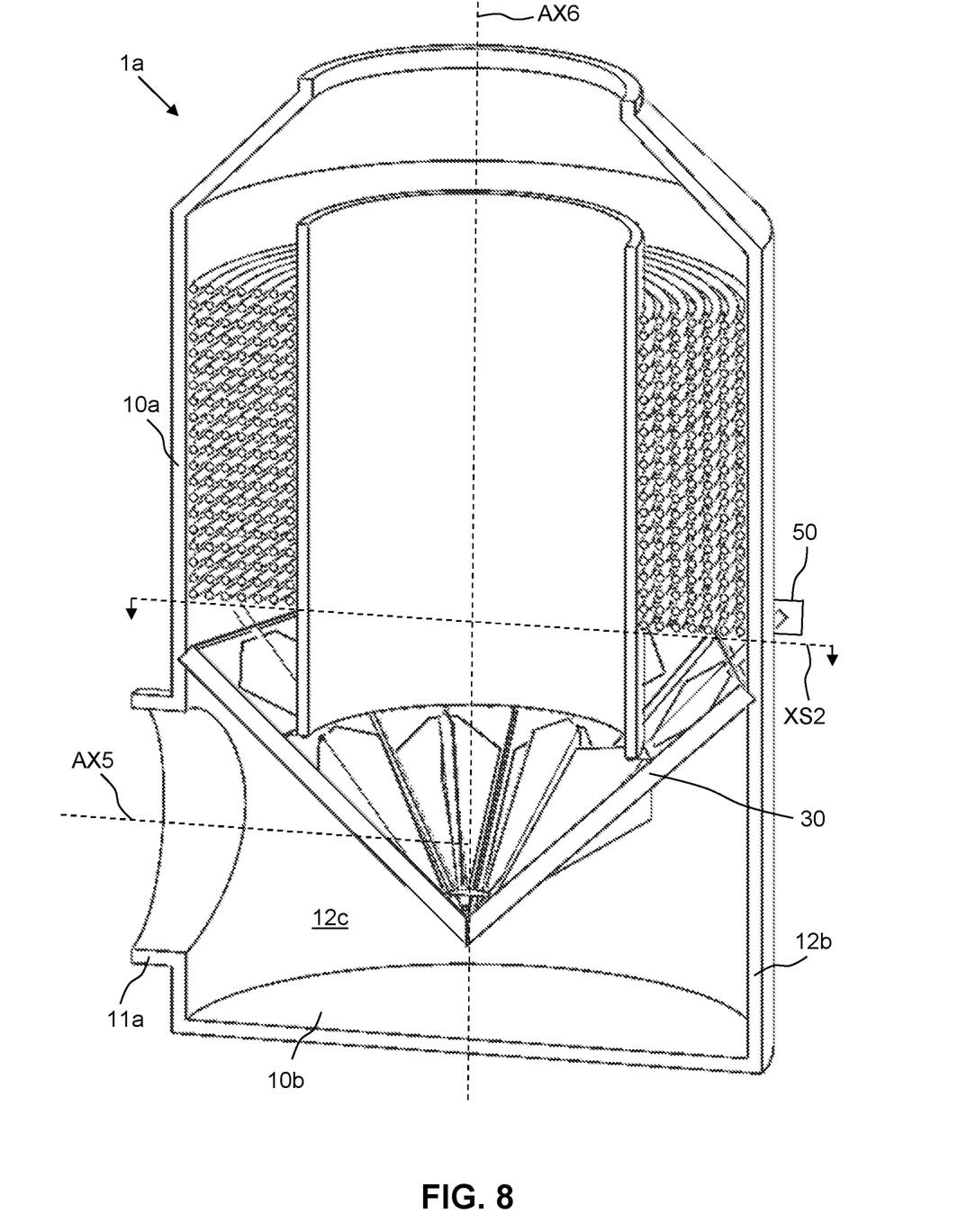
FIG. 8 shows a schematic sectional diagram of a heat exchange unit according to a second embodiment of the invention.

FIG. 8 shows a schematic diagram of a heat exchange unit 1a according to a second embodiment of the invention. This embodiment is the same as the first embodiment, except for that the lower portion 12b of the outer casing pipe 10a defines an inlet duct 11a that enters at the side of the inlet manifold 12c, rather than beneath the inlet manifold. The bottom of the outer casing pipe 10a may be closed off at a bottom 10b.

The inlet duct 11a may have a central axis AX5, which may intersect with the central axis AX6 of the damper 30 and the inner and outer casing pipes, at a perpendicular angle. Then hot gas entering the inlet manifold 12c from the inlet duct 11a will impinge upon the side of the conical damper 30, splitting the gas flow into one flow that moves in a clockwise direction around the circumference of the damper and one flow that moves in an anticlockwise direction around the circumference of the damper. The distal ends of the shafts have each been fitted with actuators 50 on the exterior of the outer casing pipe 10a to drive and control the rotations of the shafts.

Figure 9:
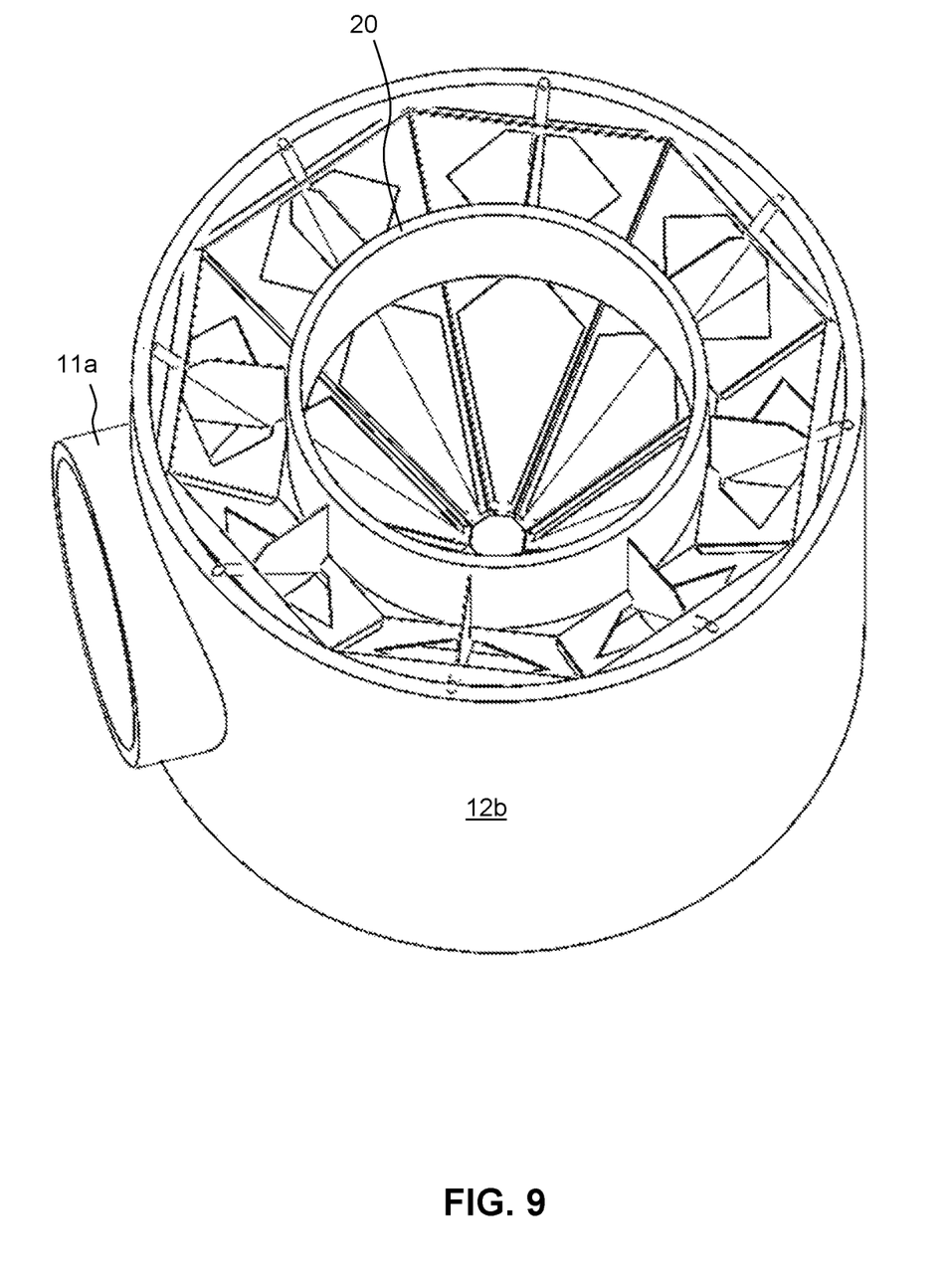
FIG. 9 shows a schematic sectional diagram of the heat exchange unit of FIG. 8, taken from line XS2 marked on FIG. 8.

The schematic diagram of FIG. 9 shows a sectional view of the heat exchange unit 1a, taken along line XS2 marked on FIG. 8. The end of the inner casing pipe 20 is visible in FIG. 9. The end of the outer casing pipe 10a is also visible in FIG. 9, and it can be seen how the inlet duct 11a extends from the side of the lower portion 12b of the outer casing 10a.

Many other variations of the described embodiments falling within the scope of the invention will be apparent to those skilled in the art. For example, the points 35p1, 35p2, 36p1, and 36p1 of the paddles could be blunted into gentle curves or the tapers could be truncated at their ends so the paddles would have short straight sides at their further radial extents from the shafts. It would also be possible to truncate the cone shape of the damper so that it ended in a flat frustum instead of the pointed tip of the lower brace 37.

The invention claimed is:

1. A heat exchange unit for recovering heat energy from a hot gas, the heat exchange unit comprising an inlet duct for receiving the hot gas, a heat exchange duct having a heat exchanger for recovering heat from the hot gas, and a bypass duct which bypasses the heat exchange duct and the heat exchanger, wherein the heat exchange unit further comprises a damper configured to apportion the hot gas from the inlet duct between flowing through the heat exchange duct and flowing through the bypass duct, wherein the damper is in the shape of a cone and comprises a plurality of shafts extending from a base of the cone towards an apex or frustum of the cone, the shafts fitted with paddles for opening and closing the heat exchange duct and bypass duct, wherein the shafts are rotatable to move the paddles to apportion the hot gas between flowing through the heat exchange duct and flowing through the bypass duct.

2. The heat exchange unit of claim 1, wherein the heat exchange unit comprises an inner casing pipe and an outer casing pipe that together define the bypass and heat exchange ducts.

3. The heat exchange unit of claim 2, wherein the inner casing pipe is inside of the outer casing pipe, and wherein the heat exchange duct and the bypass duct are arranged with one inside of the other.

4. The heat exchange unit of claim 2, wherein the damper comprises a plurality of struts extending from the base of the cone shape towards the apex or frustum of the cone shape, and wherein each strut is attached to the inner casing pipe and to the outer casing pipe.

5. The heat exchange unit of claim 4, wherein the plurality of struts each comprise a distal end at the base of the cone shape and a proximal end at the apex or frustum of the cone shape, wherein the distal ends of the struts are attached to the outer casing pipe, and wherein an end of the inner casing pipe is attached to the struts at points intermediate of the distal and proximal ends of the struts.

6. The heat exchange unit of claim 2, wherein the outer casing pipe extends beyond an end of the inner casing pipe, and wherein the extension of the outer casing pipe beyond the end of the inner casing pipe defines an inlet manifold to which the inlet duct is connected.

7. The heat exchange unit of claim 6, wherein the damper defines a boundary between the inlet manifold and the bypass and heat exchange ducts, the hot gas from the inlet duct required to pass through the damper before reaching the bypass and heat exchange ducts.

8. The heat exchange unit of claim 2, wherein the bypass duct is an interior of the inner casing pipe, and wherein the heat exchange duct is a tubular region between the inner and outer casing pipes.

9. The heat exchange unit of claim 8, wherein the heat exchanger comprises fluid pipes within the tubular region, and wherein the fluid pipes are fixed to the inner casing pipe, the inner casing pipe supporting the whole weight of the fluid pipes.

10. The heat exchange unit of claim 9, wherein the fluid pipes are wound in coils about an axis that is aligned with a lengthwise axis of the inner casing pipe.

11. The heat exchange unit of claim 2, wherein the end of the inner casing pipe extends inside of the cone shape, and the damper is orientated with the apex or frustum of the cone shape pointing in a direction away from the inner casing pipe.

12. The heat exchange unit of claim 1, wherein the shafts comprise proximal ends adjacent the apex or frustum of the cone shape and distal ends adjacent the base, and wherein the damper comprises an actuator adjacent the distal ends configured to control an angle of rotation of each shaft.

13. The heat exchange unit of claim 1, wherein each shaft comprises two of the paddles at different locations to one another along a length of the shaft, wherein one of those two paddles is configured to control flow of hot gas into the heat exchange duct and the other of those two paddles is configured to control flow of hot gas into the bypass duct.

14. The heat exchange unit of claim 1, wherein the paddles extend radially outward from the shafts, and each paddle tapers to a point as it extends radially away from the shaft.

15. The heat exchange unit of claim 1, wherein the damper comprises panels that define an outer lateral surface of the cone shape, wherein the panels define a plurality of apertures through the outer lateral surface, and wherein the paddles are sized to substantially fill corresponding ones of the apertures at specific angular rotations of the shafts.

16. The heat exchange unit of claim 1, wherein the inlet duct has a lengthwise axis which is aligned with a lengthwise axis of the cone shape.

17. The heat exchange unit of claim 1, wherein the inlet duct has a lengthwise axis which intersects with a lengthwise axis of the cone shape.

* * * * *